R. G. LANDIS.
VEHICLE BODY.
APPLICATION FILED JAN. 31, 1918.
1,322,122.
Patented Nov. 18, 1919.
2 SHEETS—SHEET 2.
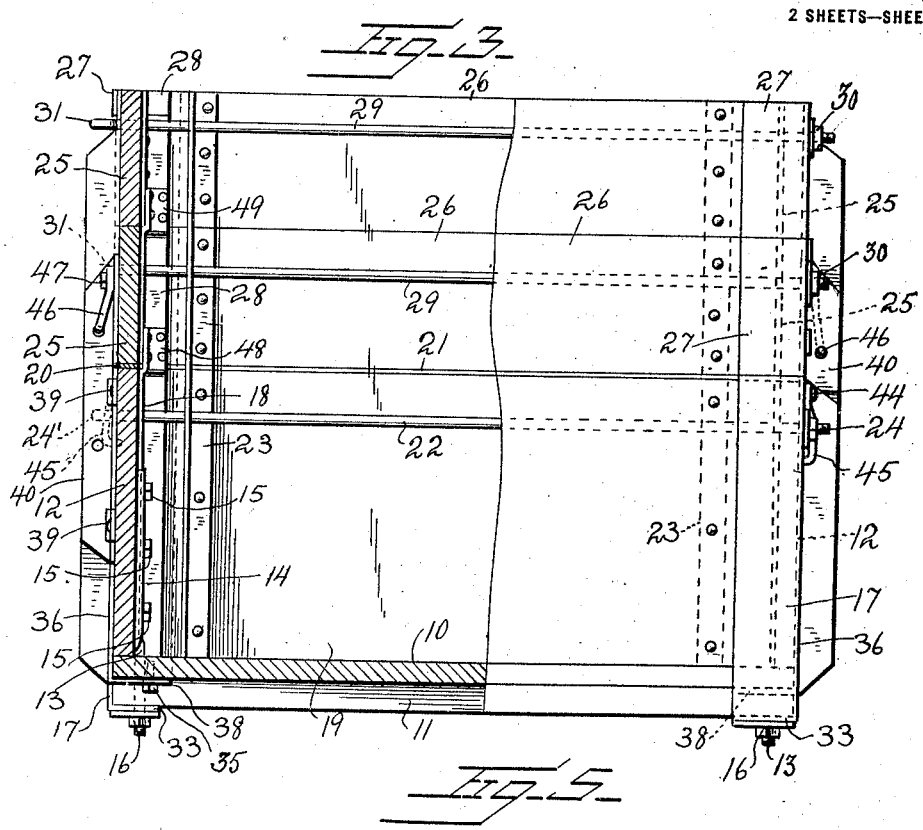
Inventor
R. G. Landis
By Lacey & Lacey
Attorneys

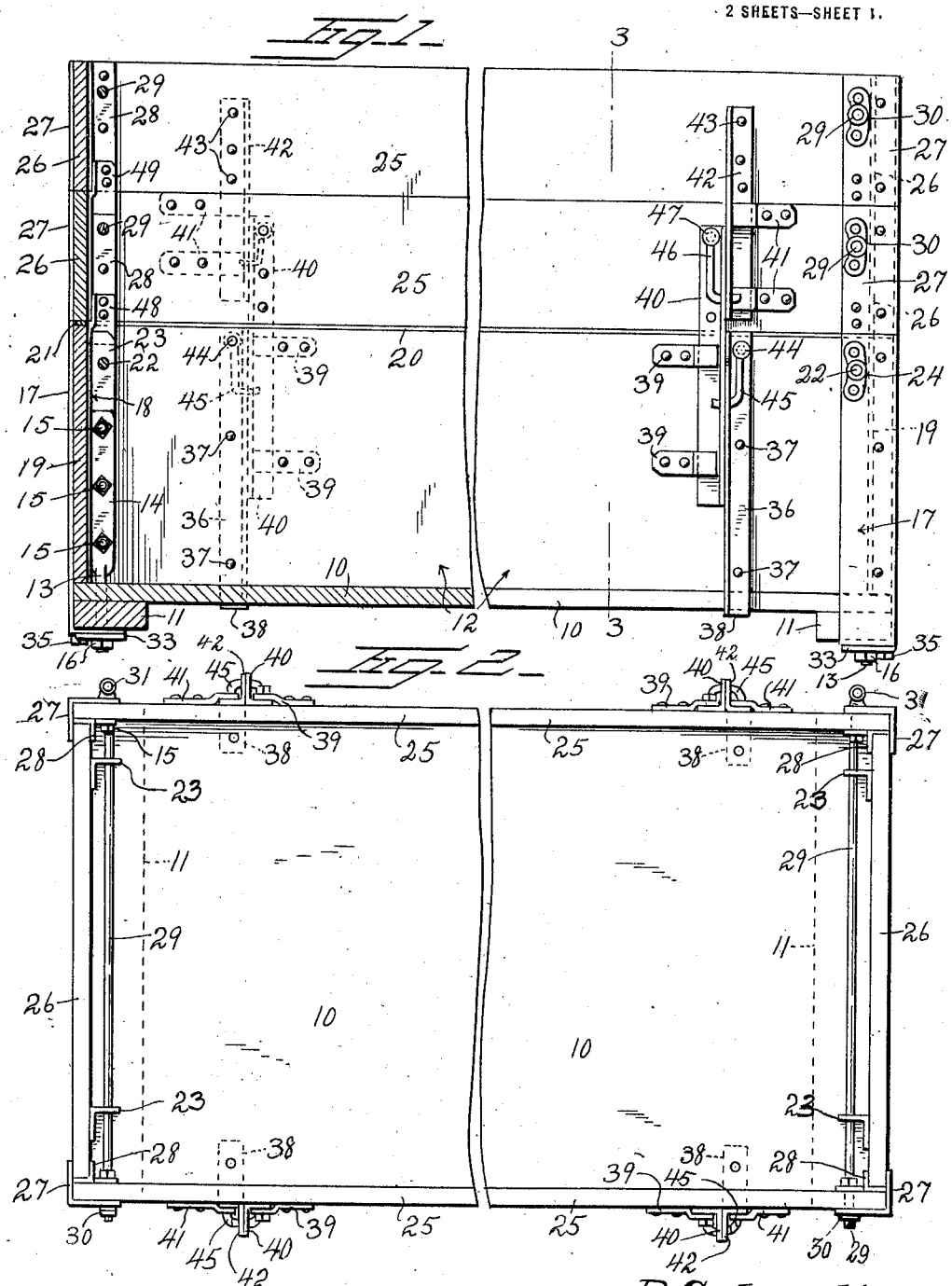

UNITED STATES PATENT OFFICE.

ROY G. LANDIS, OF NELIGH, NEBRASKA.

VEHICLE-BODY.

1,322,122.     Specification of Letters Patent.     Patented Nov. 18, 1919.

Application filed January 31, 1918. Serial No. 214,677.

*To all whom it may concern:*

Be it known that I, ROY G. LANDIS, a citizen of the United States, residing at Neligh, in the county of Antelope and State of Nebraska, have invented certain new and useful Improvements in Vehicle-Bodies, of which the following is a specification.

This invention relates to improvements in vehicle bodies, more particularly to ordinary farm or freight wagon bodies, and has for one of its objects to improve the mechanism whereby the end gates are detachably supported in position, and whereby the extension members of the body which are mounted upon the same are also detachably supported in position thereon.

Another object of the invention is to provide means whereby the various members of the body may be coupled, and wherein a saving is effected in the amount of lumber required to form the bottom and sides of the body.

With these and other objects in view, the invention consists in certain novel features of construction, as hereinafter shown and described and then specifically pointed out in the claim; and in the drawings illustrative of the preferred embodiment of the invention—

Figure 1 is a side elevation, partly in section, of a wagon body constructed in accordance with the invention.

Fig. 2 is a plan view of the same.

Fig. 3 is a transverse view, partly in section.

Fig. 4 is a detached perspective view of one of the outside combined corner supports and outer guides for the end gate.

Fig. 5 is a detached perspective view of one of the inside guides for the end gates.

Fig. 6 is a detached perspective view of one of the inside guides for the vertical extensions of the body.

Fig. 7 is a detached perspective view of one of the guide clips.

Fig. 8 is a detached perspective view of one of the combined guides and stops.

The ordinary body portion of a vehicle of the class to which the improved device is applied comprises a bottom or floor 10 supported by a plurality of transverse members 11. The side members of the body are indicated at 12 and bear upon the outer edges of the floor 10 and are coupled thereto by a plurality of fastening devices including a threaded bolt portion 13 and a flattened or plate-like portion 14, the latter being bolted or otherwise secured as shown at 15, to the side members 12. The bolt portions 13 extend through the floor 10 and the transverse supports 11 and are provided with clamp nuts 16 at their lower ends. Disposed upon the outer faces of the body at its corners, or at the ends of the side members 12 and the transverse supports 11, are L-shaped corner members 17, with one web of each corner member bearing upon the adjacent outer face of the side member 12 and with the other web extending inwardly of the side member and against the adjacent side face of the transverse supports. Bearing against the inner faces of the side members 12 at their ends are other L members 18 with one web of each bearing against the adjacent side member and the other web extending inwardly and in parallel relation to the inwardly extending portion of the adjacent corner member 17. The inwardly directed webs of the members 17—18 thus form guides for the ends of the end gates 19 as illustrated in Fig. 2. The portions 14 of the coupling members are located close to the inwardly directed webs of the members 18, as shown in Figs. 1 and 2, with the bolts 15 passing through the side members 12 and the adjacent webs of the corner members 17. The upper edges of the sides 12 and the end gate members 19 are provided with metal wear straps 20—21 as shown.

Tie rods 22 extend through the side members 12, and the corner members 17. Attached to the inner faces of the end members 19 are L members 23, the inwardly directed webs of the latter being pierced to receive the tie rod 22. Attached to one of the corner members 17 at each end of the body is a socket 24 to receive the threaded terminal of the rod 22, the opposite end of the rod being provided with means, such as an eye 24', to enable the rod to be rotated. By this means the side members 12 may be strained or compressed toward each other, and thus locked in position, and at the same time the rods coacting with the holding members 23 support the end gates 19 in position.

Bearing upon the upper edges of the side members 12 are extension side members 25, while similar extensions 26 bear upon the upper edges of the end gate members 19. Any required number of the extension members 25—26 may be employed to increase the vertical height of the body, but for the purpose of illustration two of the side extensions and two of the end gate extensions are shown.

The vertical extension members are provided with corner members 27 similar to the corner members 17, and in alinement vertically therewith, as shown.

Each of the side extensions 25 is likewise provided with L-shaped members 28 with one web attached to the extension members 25 and the other web directed inwardly and corresponding to and in vertical alinement with the inwardly directed web of the L-shaped members 18 of the side members 12. The members 17 and 27 and the members 18 and 28 coact to form guides for the end gate members 19 and the end gate extensions 26. Tie rods 29 extend through the corner members 27 and the side extensions 25 and are received at one end in threaded sockets 30 corresponding to the socket 24 of the body, each of the rods 29 being provided with a terminal eye 31 to enable the rods to be rotated in the same manner as previously described for the rods 22. By this means the side members and their extensions and the end gates and their extensions are firmly coupled and held in relative position.

At their lower ends the corner members 17 are folded laterally and the folded portions superimposed as shown at 33 and bear beneath the transverse supports 11, and the bolt portions 13 of the fastening devices pass through the superimposed portions 33. One of the webs of each of the members 18 is extended and directed laterally as shown at 34 in Fig. 5, and bears upon the adjacent face of the floor 10. The laterally directed portion 34 is apertured to receive a binding bolt 35 which extends through the floor 10, transverse support 11, and the superimposed portions 33 of the corner supports. The parts 10—11—13, the corner members 17, and the guide members 18 are thus firmly united and supported.

In the ordinary construction of end gate supports of wagon bodies, relatively wide outer cleats are employed to hold the end gate from outward movement, and the bottom 10 projects beyond the end gate a distance equal to the width of the outer end gate cleat. In the structure disclosed by applicant the outer face of the end gates 19 and the outer ends of the bottom 10 are flush, thus dispensing with the objectionable projection of the bottom, and likewise materially reducing the lengths of the side members 12 and the side extensions 25. An appreciable saving in the amount of lumber required to construct the body is thus secured with a corresponding saving in expense. Another advantage secured by thus constructing the device is that projecting ledges are obviated which catch dust, mud and other accumulations.

Attached to the side members 12 relatively near their ends are vertical supporting members 36 in L-shape transversely with one web riveted or otherwise attached, as shown at 37, to the side members, and the other web extending outwardly. At its lower end the web of the member 36 which bears against the side member is extended and turned beneath the floor 10 as shown at 38, and bolted or otherwise attached thereto. By this means the attaching means 13—14 is supplemented, and the junctures of the bottom 10 and the side members 12 of the body correspondingly strengthened and reinforced. Attached to the side members 12 adjacent to each of the supports 36 are clip devices 39. Attached to each of the lower extension members 25 is an L-shaped member 40 extending below the line of the lower member 25 and engaging by one web beneath the clips 39 while the other web extends outwardly from the face of the extension member and of the body member 12 and in engagement with the outwardly extending web of the member 36. The members 40 thus serve as supports to maintain the extension members 25 in position relative to the side members 12, and effectually prevent both lateral and longitudinal movement. The lower extension member 25 is provided with guide clips 41, similar to the guide clips 39, while the upper extension member 25 is provided with an L-shaped member 42 riveted or otherwise secured thereto, as shown at 43, with one web extending beneath the clips 41 while the other web of the member 42 bears against the outstanding web of the member 40. By this means the outer extension members 25 are held from lateral or longitudinal displacement.

Pivoted at 44 to each of the members 36 is a hook device 45 passing by its laterally directed terminal through apertures in the outstanding webs of the members 36 and 40, while a similar hook 46 is pivoted at 47 to the L-shaped member 40 and extends through apertures in the outstanding webs of the members 40 and 42. By this arrangement the members 12 and 25, are firmly coupled and held in position not only from lateral and longitudinal movement but likewise from outward movement.

Stop clips 48 are riveted or otherwise attached to the L-shaped members 28 of the lower extension side member 25, and extend over the adjacent portions of body sides 12, while similar stop clips 49 are attached to the members 28 of the upper side extensions 25 and project below the lower line of the same and against the adjacent face of the lower side extension member 25.

By this means the extension members 25 and 26 are firmly supported from lateral or longitudinal displacement.

Having thus described the invention, what is claimed as new is:

The combination with a receptacle including sides and bottom and transverse supporting members, of combined corner guards and end guides each formed of an L member bearing by one web against one of the sides and beneath the adjacent transverse supporting member with the other web extending inwardly of the side, another L member bearing by one web against the inner face of one of the sides and the other web extending inwardly of the side and coacting with the inwardly extending web of the corner guard to form a guide for an end gate, and fastening devices extending through the bottom and the portion of the corner guard which extends beneath the supporting member.

In testimony whereof I affix my signature.

ROY G. LANDIS. [L. S.]